United States Patent

Fowler

[11] Patent Number: 5,991,454
[45] Date of Patent: Nov. 23, 1999

[54] DATA COMPRESSION FOR TDOA/DD LOCATION SYSTEM

[75] Inventor: Mark L. Fowler, Ithaca, N.Y.

[73] Assignee: Lockheed Martin Coporation, Bethesda, Md.

[21] Appl. No.: 08/944,837

[22] Filed: Oct. 6, 1997

[51] Int. Cl.⁶ .................................................. G06K 9/00
[52] U.S. Cl. .......................................... 382/251; 382/239
[58] Field of Search .................................... 348/405, 384, 348/396, 419, 415, 418, 422; 360/48, 53; 386/112; 341/87, 65; 704/212, 206, 205, 229, 200, 203; 345/202; 370/477; 382/246, 253, 251, 250, 232, 233, 234, 235, 236, 238, 239, 240, 243, 244, 245, 248, 249, 252; 709/247; 710/68; 708/402; 358/445, 448, 455; 340/825.8

[56] References Cited

U.S. PATENT DOCUMENTS

| | | | |
|---|---|---|---|
| 4,433,335 | 2/1984 | Wind | 343/463 |
| 5,327,144 | 7/1994 | Stilp et al. | 342/387 |
| 5,369,724 | 11/1994 | Lim | 395/2.15 |
| 5,491,481 | 2/1996 | Akagiri | 341/87 |
| 5,508,949 | 4/1996 | Konstantinides | 364/725 |
| 5,512,908 | 4/1996 | Herrick | 342/387 |
| 5,561,431 | 10/1996 | Peele et al. | 342/90 |
| 5,570,099 | 10/1996 | DesJardins | 342/378 |
| 5,583,573 | 12/1996 | Asamura et al. | 348/405 |
| 5,600,706 | 2/1997 | Dunn et al. | 379/59 |
| 5,608,410 | 3/1997 | Stilp et al. | 342/387 |
| 5,680,266 | 10/1997 | Park | 360/48 |
| 5,724,452 | 3/1998 | O'hara | 382/251 |
| 5,724,453 | 3/1998 | Ratnakar et al. | 382/239 |
| 5,760,918 | 6/1998 | Tanioka et al. | 382/252 |
| 5,818,529 | 10/1998 | Asamura et al. | 348/396 |
| 5,831,872 | 11/1998 | Pan et al. | 382/253 |
| 5,832,131 | 11/1998 | Choo et al. | 382/253 |

*Primary Examiner*—Bijan Tadayon
*Attorney, Agent, or Firm*—Whitham, Curtis & Whitham

[57] ABSTRACT

Compression of data representing waveform information is dynamically adapted to the waveform by performing a transformation on blocks of samples of the waveform to derive a plurality of coefficients representing a portion of the waveform corresponding to a block of samples and computing quantizer step sizes (quantitative increments of digitization) and quantizer sizes (number of bits for transmission of the coefficients) based on the relative magnitude and dynamic range of the coefficients and a user-specified parameter. The user-specified parameter may be used to set a lower limit on performance such as an upper limit on quantization noise or distortion (in which case data rate is automatically minimized) or a data rate for a communication link (in which case performance relative to quantization noise or distortion is maximized). Relatively insignificant coefficients and quantizer sizes smaller than the quantizer step size may be set to zero to further reduce the data rate or improve data fidelity for the bandwidth of the data link. Forward error correcting codes and gray codes are preferably employed for data transmission.

33 Claims, 8 Drawing Sheets

DATA COMPRESSION FOR TDOA/DD LOCATION SYSTEM

STATEMENT OF GOVERNMENT INTEREST

The present invention was made in the course of work funded under U.S. Government contract MDA904-96-C-0863.

BACKGROUND OF THE INVENTION

1. Field of the Invention

The present invention generally relates to communication employed in position locating systems and, more particularly, to data compression for reduction of communication delays.

2. Description of the Prior Art

Position locating methodologies and instruments for practicing them have been known and employed throughout the history of navigation. Many early techniques relied on multiple or timed measurements of relative position or direction to visible objects and thus were reliant upon the existence of suitable conditions such as weather to be carried out. More modern systems have exploited other communication media such as radar and radio to avoid such vulnerability. However, until very recently, the accuracy of such systems was relatively low and limited by the accuracy of measurements which could be achieved, often in noisy, long-range or otherwise adverse circumstances such as multiple transmission paths due to signal reflections.

Modern positioning systems exploit triangulation relative to a plurality of spatially separated platforms, such as geo-stationary satellites, which provide redundant coverage of the entire surface of the earth. (Three platforms are necessary to obtain a location relative to the earth's surface (e.g. latitude and longitude) and four platforms are necessary to triangulate a location in three dimensions (e.g. including altitude). Generally at least six platforms are potentially available from any location.)

In such systems, measurements are generally made by analyzing timing and/or frequency of signals transmitted between the location of interest and a suitable number of the platforms rather than measurement of direction or other parameters and results are potentially accurate to within a very few feet. In so-called global positioning systems, signals transmitted from several platforms are analyzed at a receiver which is local to the user. Somewhat similar techniques may be used to determine a position of a source (e.g. transmitter or reflector) of a signal. In these latter systems, it is generally necessary to transmit a signal from the location of interest to be received at plural platforms; the received signal being first evaluated for quality. The best three or four received signals are evaluated in pairs to derive a locus of possible locations for each pair of signals and the region of intersection of the loci corresponding to respective pairs of signals is reported as the location of the transmitter.

While numerous analysis techniques are possible, so-called time difference of arrival (TDOA) and differential doppler (DD) analyses of signals, often in combination (TDOA/DD) to develop a velocity vector if the source is moving or improve location accuracy where the source is stationary and one or more receivers are in motion, are techniques of choice. However, the performance of cross-correlation computations, the details of which are well-understood in the art and, in any case, unimportant to the practice of the invention, to obtain a location of the transmitter requires all data representing the received signals in detail to be present at a single location. Thus communication time to such a location becomes a critical factor in system performance, particularly in regard to fast-moving vehicles such as aircraft. (In this regard, it should be appreciated that the data rate for transmission will often be fixed by the communication link and possibly further limited by conditions thereon.) Specifically, to avoid distortion of signals during communication, the signals received at each platform are usually digitized and a digital representation of the received signals, together with time references (to provide functional coherence of the receivers) is transmitted from each platform to the location (usually a facility corresponding to one of the platforms) where the cross-correlation computation is to be performed.

The digital representation is usually transmitted in a serial coded (e.g. binary) bit stream. Therefore, the transmission time is, at least in part, a function of the number of bits used to represent the signal and the time references and the capacity or bandwidth of the transmission link. By the same token, the fidelity with which the digital signals represent the received signals is a function of the number of bits required to support the desired degree of resolution in representation of the signal. The accuracy of the location derived from the cross-correlation computation is a function of the resolution or fidelity of the digital representation of the signals. Accordingly, it can be readily understood that there is a trade-off between response time and location accuracy as incidents of system performance.

An additional problem is presented by the relative frequency content of the original signal and high sampling rates which may be intended to capture high frequency content. High sampling rates may result in very low or negligible values of coefficients or parameters of data representing such high frequencies if the signal has relatively little energy or power in high frequency components. In other words, a signal having little high frequency content may be "over-sampled" at relatively conventional sampling rates (or sampling rates of which the platform may be capable for high resolution), and a burden placed on the communication link to transmit information which is not significant to the result if, in fact, such information exist to more than a negligible degree.

Additionally, it is customary at the present time to carry out transmission of digital information by so-called packet switching in which packets of digital information are provided with digital header information so that the original bit stream can be reassembled even when the packets may not be transmitted over the same communication link or arrive in the original order. Overall, this expedient, while requiring additional bits to be transmitted, increases transmission efficiency and reliability since some communication path can generally be found at any point in time. Nevertheless, the transmission path will generally be imperfect and the loss or corruption of a bit in the header information may defeat or severely compromise reassembly of the data bit stream and, consequently, the entire position location process for that data stream.

The only solution to this potential problem is to provide some degree of redundancy into the digital code which, in view of the numerical nature of the information in the bit string implies that even more bits be transmitted in order to implement correctability and recovery of lost or corrupted bits of the header and numerical information. Signal protocols and formats including such redundancy for signal recovery are referred to as error-correcting codes. Therefore, even though transmission can be made highly reliable in this manner, the number of transmitted bits remains a critical limitation on the speed of system response and often dictates a reduction in the number of bits representing the received signal in order to provide system response with the required timeliness. Accordingly, numerous schemes for data compression to reduce the number of data bits transmitted have been attempted.

A trivially simple method of reducing the number of transmitted bits, currently in use in the art, is to truncate the digitized data in time or amplitude resolution. (That is, fewer bits are transmitted for each sample of the received waveform than are available or fewer samples are represented than are initially quantized or both. In regard to the latter, it is fairly common for a severe mismatch to exist between the data sampling rate and the available communication data rate which, at the state of the art prior to the present invention, must be corrected by additional and often complex data processing.)

However, such truncation may severely impair the accuracy and/or resolution of the location determined from the cross-correlation computation and may increase difficulty or compromise success of the cross-correlation computation. Accordingly, it is known to perform some processing or transformation on the original data to minimize the effect of a data compression for reducing the number of bits transmitted. For example, U.S. Pat. No. 5,570,099 to Gerard Desjardins, assigned to the assignee of the present invention, which is hereby fully incorporated by reference describes a system in which a transformation is performed on data before transmission. (Data compression other than mere truncation, of course, implies that a complementary process must be performed after transmission in a manner similar to coding and decoding of data.) Performing a so-called wavelet transform (discussed, for example, in U.S. Pat. No. 5,561,431 to Larry Peele which, including publications cited therein, is hereby fully incorporated by reference) is another known and well-understood processing technique of choice. The wavelet transform (WT) is a digital signal processing technique that transforms N signal samples into N WT coefficients which describe the distribution of the energy of the signal simultaneously in both time and frequency.

Nevertheless, some degree of degradation of the information will be attributable to the data compression due to both the resolution at which the transformation is computed and the resolution of the data transmitted. A trade-off will thus continue to exist between the amount of compression and the amount of signal degradation that will occur. A common measure for the amount of degradation is the signal-to-quantization ratio (SQR) which is defined as the ratio of the power of the original signal to the power of the difference between the original signal and the compressed form of the signal. A low SQR corresponds to high degradation (due to the relatively larger power of the difference).

It should also be understood that the use of packet switching and error-correcting codes is done at the expense of speed of system response within the limitations thereon imposed by the data link which may also be variable with conditions such as noise. While it is known to dynamically vary data transmission rate and alter coding and decoding techniques (specified in data packet header information) to accommodate available data transmission rates and insure reliable transmission within the available transmission rate, the degree of signal degradation and hence the resolution of location determined by the system will correspondingly vary uncontrollably. Thus, while timely response of the system may generally be assured, there is no corresponding capability at the current state of the art to assure or even evaluate the performance of the system in terms of the quality/fidelity of the data utilized by the system or location resolution derived therefrom.

SUMMARY OF THE INVENTION

It is therefore an object of the present invention to provide a system and data compression arrangement particularly suited for a global location allowing control of both response speed and data transmission quality.

It is another object of the invention to provide enhanced resolution performance of a global location system or other system requiring rapid, high-fidelity communication of waveform information within communication data rate availability.

It is a further object of the invention to provide a robust and reliable position location system which minimizes limitations imposed by data communication conditions.

It is yet another object of the invention to provide a position locating system which minimizes data transmission rate consistent with a specified level of performance or communication link capacity.

It is a yet further object of the invention to provide a data compression system which compensates for oversampling of a received signal relative to an available data rate or user specified limitation on quantization noise or distortion in the compression process.

In order to accomplish these and other objects of the invention, a method and apparatus for data compression suitable for use in a position location or synthetic aperture radar system is provided including arrangements for performing the steps of sampling the waveform to develop a block of samples, performing a transform on the samples to derive a plurality of coefficients, segmenting the plurality of coefficients into a plurality of sub-blocks, deriving a quantizer size and a quantizer step size in accordance with a user-specified parameter and a maximum absolute value of coefficients in a sub-block, and quantizing the plurality of coefficients in accordance with the quantizer size and the quantizer step size. The coefficints and/or the sub-blocks of coefficients can be evaluated to further compress the data by selectively setting coefficients or quantizer sizes of selected sub-blocks to zero to further compress the data. Use of a wavelet transform is preferred for the practice of the invention.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
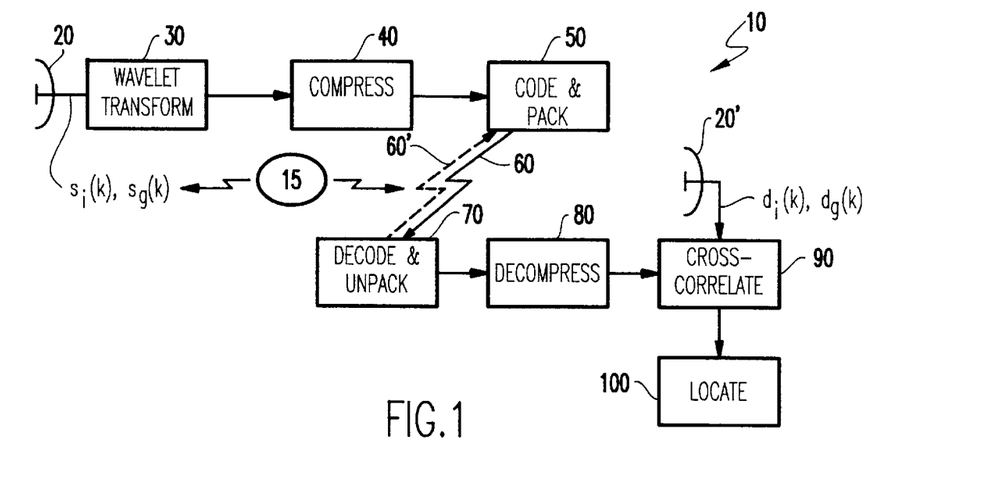
FIG. 1 is a high-level block diagram of a position location system in accordance with the invention.

Referring now to the drawings, and more particularly to FIG. 1, there is shown a high-level block diagram representing a communication path in accordance with the invention. It should be understood that, at the level of abstraction of FIG. 1, the block diagram may also be considered as generically illustrative of other position locating arrangements including data compression, such as the system described in U.S. Pat. No. 5,570,099, incorporated by reference above, the invention being differentiated therefrom by the implementations of elements depicted therein which are illustrated in greater detail in other Figures. Therefore, no portion of FIG. 1 is admitted prior art as to the present invention.

By the same token, the major portion of FIG. 1 preceding the "cross-correlation" block 90 and "locate" block 100 can also be considered as illustrative of a corresponding portion of systems having other functionalities, such as synthetic aperture radar (SAR) to which the principles and techniques of the invention can also be applied. In this particular regard, while some parameters and criteria are preferred in accordance with the preferred application to position locating systems, those parameters and criteria, discussed below are, in essence, largely arbitrary and other appropriate parameters and criteria will be evident to those skilled in the art in accordance with the functionality and/or environment of other applications of the principles of the invention. In general, the invention is applicable to any system requiring transmission of numerical information.

More specifically, as shown in FIG. 1, the position locating system 10 includes a plurality of spatially separated signal receiving platforms 20, 20'. Platform 20' is depicted as providing a direct input to cross-correlation processor 90 while several data processing elements 30, 40, 50, 70 and 80 and a communication link 60 (including a retransmission request link 60') are interposed between platform 20 and cross-correlation processor 90 since, in practice, the cross-correlation processing is performed at a location corresponding to one of the platforms while other platforms spaced therefrom must communicate data to that location. It should be understood that platform 20 and its associated processing and data communication link may be replicated numerous times in a practical system although the cross-correlation processing is generally performed, as a matter of convenience and computational economy, on received signals from pairs of platforms which may or may not include "local" platform 20'.

The signal received at platform 20 may be demodulated, filtered, amplified or otherwise processed as may be desired or dictated by the transmitter 15. While a high frequency radio signal is preferred, the nature of the signal emitted and received for location detection is not at all critical to the practice of the invention. For example, radio identification beacons or transponders such as may be available on aircraft and cellular telephone transmission signals are entirely suitable for the practice of the invention. Acoustic signals such as sonar or the natural vibrations of machinery may also be used to practice the invention in, for example, underwater environments. Of course, for reliable reception by spatially separated platforms to which the transmitter 15 may be arbitrarily oriented, it is desirable that the transmitted signal be radiated substantially non-directionally. Likewise, the periodicity, if any, of the signal should be at least as long as the time difference which may result from variation of transmitter location to avoid potentially ambiguous results.

The signal available at the output of platform 20 is a time varying, complex valued signal having a real part, called the in-phase signal $s_i(k)$ and an imaginary part, called the quadrature signal $s_q(k)$. In this notation, k is an integer representing the sample number of the digitally sampled signal. In the description of data transformation, compression and other processing which follows, it should be borne in mind that separate sets of coefficients are produced corresponding to both the in-phase and quadrature portions of the signal and that the same processing will be independently applied to each set of such coefficients. Accordingly, for clarity, the following discussion will refer to signal s(k) as representative of the processing independently applied to each of the portions of the complex values.

Once the received signal is in suitable form for sampling and minimization of noise effects, a wavelet transformation 30 is performed. The details of the wavelet transformation are known and well-understood by those skilled in the art and are not critical to the practice of the invention. In fact, while the wavelet transformation is considered to be much preferred for position locating processes and the preferred methodology of the invention due to properties of the wavelets, computational economy and form of the output, other transformations which alter the domain to facilitate compression and decompression after transmission could potentially be used and may be preferable for other applications of the invention such as synthetic aperture radar alluded to above. Certainly, the invention is applicable to any transformation which results in a significant degree of concentration of information in some of the coefficients derived therefrom (e.g. significant irregularity in distribution of information over the coefficients). Nevertheless, the wavelet transformation process is considered to be much preferred at the present time for practice of the invention since it is, by its nature, particularly efficient in concentrating information in relatively few coefficients for an arbitrary and time-limited waveform as well as allowing numerous computational efficiencies to be developed.

Essentially, the wavelet transform process is an extension of the Fourier transform (FT) in the sense that it provides a decomposition of the signal in terms of a set of component signals. In the case of a Fourier transform, the signal is decomposed into a weighted sum of complex exponentials which exist for all time (or, in the case of the discrete Fourier transform (DFT), for the entire duration of the signal). The wavelet transform decomposes a signal into a weighted sum of component signals that are each localized in time as well as in frequency; allowing them to provide a more efficient representation of signals with time-varying spectra.

Figure 1A:
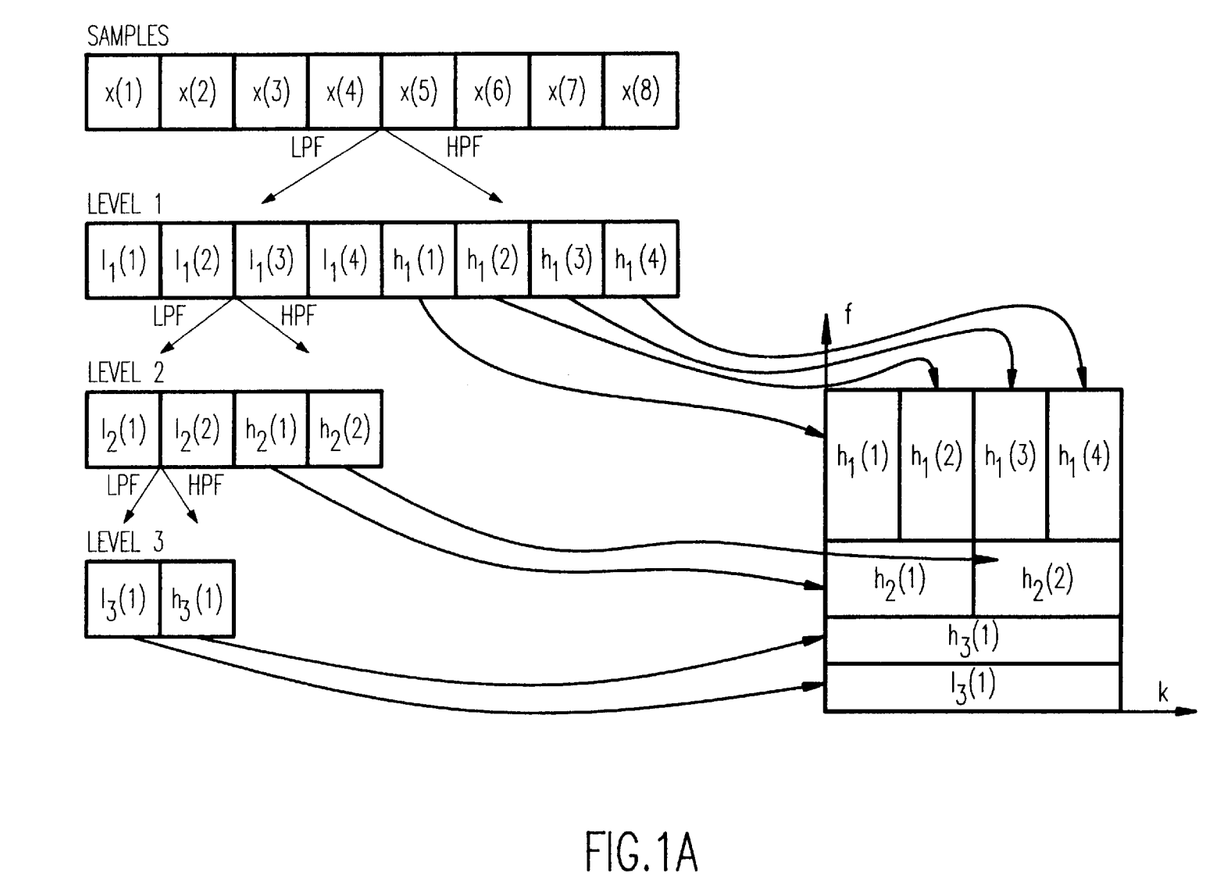
FIG. 1A illustrates a generalized methodology of the wavelet transform indicating correspondence with regions tiling the time-frequency plane.

The wavelet transform of a discrete time signal of $N=2^M$ samples is easily computed using O(N) computations (where "O" is a notation indicating "on the order of; meaning in this context that the number of computations is proportional to N) using a tree-like cascade of complementary low-pass and high-pass filters (LPF and HPF, respectively in FIG. 1A).

Levels of the wavelet transform (three levels being shown in FIG. 1A) correspond to the number of divisions of the (remaining) portion of the signal into half bands which are then decimated by a factor of two. (The digital filtering computation for each of the HPF and LPF filters develops a sequence of numbers equal to the number of inputs, of which only alternating ones of the numbers are used.) Thus, if the input signal to any level is of length N (samples or prior level LPF outputs—eight being shown in FIG. 1A), the output of the stage following the low-pass filter has length N/2 (the length of the high-pass filter branch is also thus N/2), and so on. This process is continued through a number of stages of filters based on N until the last filter pair outputs one sample each (e.g. $l_3(1)$ and $h_3(1)$ in FIG. 1A) and the total number of WT coefficients will equal the number of samples.

Therefore, the maximum number of stages or levels of the wavelet decomposition of N samples is $log_2 N$. It is possible to stop decomposition after fewer (e.g. L) levels or stages; in which case, the number of samples output by the final filter stages is $2^{(M-L)}$. (Thus, as will be described below, if $N=2048=2^{11}$ and L equals 8, the final filter stages after decimation will each output $2^{(11-8)}=8$ samples).

The inverse wavelet transform can be implemented with similar convenience by changing the decimation following each complementary filter stage to interpolation (by a similar factor of two) and reversing the order of the filter coefficients. Thus both the decomposition and reconstruction require the same number of computations.

It should be noted from the foregoing and the right-hand side of FIG. 1A which represents the tiling in equal areas of the time-frequency plane by the wavelet transform coefficients, that using half-band filters initially yields broad frequency resolution (e.g. half the bandwidth considered) but narrow time resolution (e.g. for $h_1(1)$ through $h_1(4)$) because the samples remain closely timed while, at the final stage (level 3 of FIG. 1A), the signals $l_3(1)$ and $h_3(1)$ represent relatively narrow frequency resolution but broad time resolution (because of the single or relatively fewer samples representing the frequency content in that (narrower) band for the entire number of samples over the wavelet). Thus the wavelet transform coefficients, in effect, contain information concerning the signal over equal area divisions of the time-frequency plane.

The usefulness of the wavelet transformation lies in the fact that signal energy is not evenly distributed in the wavelet domain but will be concentrated in only a small number of wavelet transform (WT) coefficients while little or no energy will be represented in the majority of the WT coefficients. Therefore, the wavelet transformation process produces a set of numbers or WT coefficients in which the predominant portion of the information will be concentrated in relatively few WT coefficients and thus provides a set of data in relatively optimal form for compression. However, the wavelet transformation cannot predict the WT coefficients in which the most important information will be relatively more concentrated or how the remaining information will be distributed over the remainder of the WT coefficients.

As noted above, the wavelet transformation develops N WT coefficients from N samples of the signal. Therefore, the number of samples may be freely chosen to develop a convenient number of output coefficients. Preferably, for processor hardware and computational economy as well as signal characteristics such as bandwidth and sampling rate, 2048 samples, as alluded to above, are chosen to yield a like number of WT coefficients (for each of the in-phase and quadrature portions of the data). The wavelet coefficients are preferably computed to result in an eight level transform which, for 2048 samples, yields eight coefficients at the final output level. Again, the number of levels is essentially arbitrary but eight levels is preferred for processing economy as well as providing a useful degree of resolution without a particularly large excess number of bits in the result since many of the bits will be removed by compression as will be described below.

In contrast to known data compression schemes which treat all data in substantially the same manner, such as by removing some least significant bits from each of numerical term in the data, the present invention applies a criterion to determine the effect each numerical quantity will have on the result and accordingly limits the number of bits transmitted in accordance with the magnitude of the effect on the result that the quantity will have. That is, the resolution of each transmitted quantity is dynamically determined such that, if the quantity will have a lesser effect on the result, the quantity is transmitted at lower resolution and, conversely, if the quantity has a greater effect on the result, the quantity is transmitted at a higher resolution.

As an added advantage of the invention, the criterion may be chosen to directly insure the performance of the system to be of a predetermined quantitative level or to develop best possible performance over a data link having a known limited capacity. Further, oversampling is automatically compensated since the large number of near-zero coefficients are effectively deleted or severely compressed prior to transmission in order to avoid burdening the communication link with transmission of data of relatively little significance.

Specifically, and with reference to FIG. 2, the compression arrangement in accordance with a preferred form of the present invention will now be discussed. Alternative variant forms of this methodology/apparatus (e.g. using further information evaluation criteria or accommodating a different system constraint) will be discussed below and may be preferable in certain applications as will be apparent to those skilled in the art. It should also be understood that FIGS. 2–7 can be understood either as a flow chart or a high-level block diagram. While it is currently preferred to implement the invention by suitable programming of general purpose computers, that programming will allocate data processing hardware resources to the processes depicted. By the same token, special purpose data processors including hardware similarly provided and allocated to the processes depicted could be used in implementing the invention. As a practical matter in view of the computationally intensive wavelet transform and cross-correlation techniques, a general purpose digital computer would generally include some specialized adaptations specific to position determination and thus could be considered as hybrids between general purpose and special purpose processors.

Beginning with the digitized raw data samples from receiver 20 (also schematically indicated in FIG. 1), the samples are divided into blocks of, preferably, 2048 samples per block as indicated at 110. The blocks will be processed in sequence and a variable, m, to control looping of the process for each block is initialized at 115. In practice, the looping with incrementing of m at 145 principally functions to insure the processing and chronological identification of the blocks and may not, in fact, be terminated based on M as indicated by the branch from the evaluation of m at 140 to 110. Of course, the number of blocks, M, is arbitrary. The wavelet transform coefficients are then computed at 120 as generally described above to develop 2048 WT coefficients for the 2048 samples. Then a quantizer step size (and the RMS bandwidth, if used, as will be discussed below in regard to a perfecting feature of the invention) is computed as indicated at 130.

The formula used to compute the quantizer step size is somewhat arbitrary and/or based on theoretical and empirical evaluations of system performance. The preferred formula for the quantizer step size $\Delta$ as equal to the square root of $12P_s/SQR$ is preferred since it utilizes a common, well-accepted and easily computed performance criterion, SQR, alluded to above. In this formula, $P_s$ is the power of the signals in the mth block and the coefficient, 12, in this case, arises from modelling the quantizer noise (e.g. sometimes referred to as quantization noise) as a uniform random variable.

Essentially, the quantizer step size will determine the resolution necessary to adequately represent respective WT coefficients to satisfy the specified performance criterion, in this case, SQR. The quantizer step size is preferably applied to groups or sub-blocks of the WT transform coefficients which represent information about the wavelet over generally contiguous areas of the time-frequency plane because of the decomposition technique employed. Accordingly, the WT coefficients in a sub-block can be expected to be generally comparable in their relative contribution to the result and should be transmitted at comparable resolution. For example, the eight coefficients of each of the final stages of decomposition for 2048 samples through eight decomposition levels would require three additional levels of decomposition to fully decompose and thus would tile or subdivide a single region corresponding generally to, say, $h_3(1)$ of the right-hand side of FIG. 1A in the same manner and pattern that the three decomposition levels illustrated tile the time-frequency plane corresponding to the entire sample.

Viewed in a slightly different way particularly taking processing and transmission economy into account, the "granularity" of the tiling of the time-frequency plane in terms of significant differences in contribution to the result from region to region, generally does not justify determining resolution (as well as a number of bits) for each individual WT coefficient. In this regard, it should be noted that header bits and redundant error correcting code bits must be transmitted to reassemble the string of WT coefficients and are relatively more critical. However, such determination of a resolution and number of bits for each WT coefficient or in groups of other sizes could certainly be performed in accordance with the principles of the invention.

Figure 2:
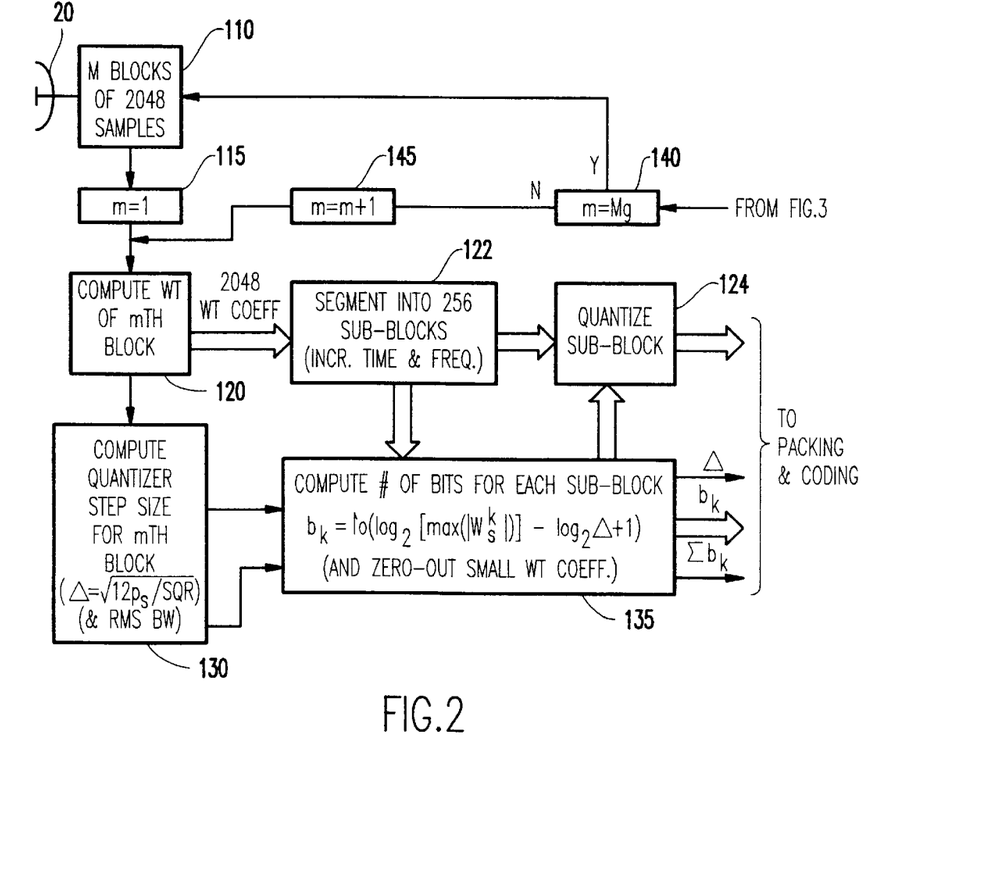
FIG. 2 is a high-level block diagram or flow chart illustrating data compression in accordance with the invention.

Following the path of the WT coefficients from element 120 of FIG. 2, the WT coefficients are segmented into sub-blocks as shown at 122, preferably of a size which, conveniently, corresponds to the minimum number of WT coefficients at the final level of decomposition. For example, with 2048 WT coefficients decomposed at eight levels leaving eight WT coefficients in the smallest group derived as shown in FIG. 1A, eight coefficients would be included in each of 256 resulting sub-blocks. The sub-blocks are then ordered in time sequence (e.g. earlier to later) and in order of frequency from low frequency to high frequency and proceeding to a next-higher frequency only after exhausting the time sequence through the samples at any particular frequency. This segmentation and ordering is, of course, trivial at the final level of decomposition but functions to further segment and order WT coefficients deriving from the high-pass filters of earlier levels of the decomposition.

Each sub-block of the WT coefficients is then evaluated at 135 of FIG. 2 to determine the number of bits to be transmitted and thus used to quantize each of its coefficients (i.e. the quantizer size) based on the dynamic range of the coefficients in the sub-block (or magnitude of the coefficient if a sub-block is allocated to a single coefficient). The formula for the quantizer size $b_k$ shown in FIG. 2 is preferred wherein $\max(|W_s^k|)$ is the largest absolute value of the (preferably eight) WT coefficients in the sub-block, the symbol $\Gamma_0(x)$ means the smallest integer that is larger than x but not smaller than zero and $\log_2\Delta$ includes the quantizer size value to indicate the number of resolution increments such a value represents (as contrasted with the quantizer value $b_k$ which establishes the number of bits used to represent the WT coefficients of the sub-block over their dynamic range at the required resolution).

Essentially this expression determines the smallest number of bits $b_k \geq 0$ such that a quantizer having $b_k$ bits and a quantizer step size $\Delta$ covers the dynamic range of the coefficients in the sub-block. The quantizer sizes thus derived are then passed to the quantize sub-block operation 124. Negative values which would result from the largest WT coefficient absolute value being less than the quantizer size value $\Delta$ are thus set to zero. The number of bits (quantizer value) and the quantizer size value are then used to translate or quantize each WT coefficient in the sub-block into a binary representation of the WT coefficient expressed in $b_k$ bits. The bits thus derived are then passed to the coding and packing operation 50 of FIG. 1 (along with the $\Delta$ and $b_k$ information used for reconstruction of the WT coefficients and a $\Sigma b_k$ signal used for error checking) which will be discussed below with reference to FIG. 3.

A perfecting feature of the invention which may provide further data compression is to compute the contribution to the RMS bandwidth for each WT coefficient in the sub-block and zero-out WT coefficients which do not contribute significantly. This is done by computing a weighted summation of the squares of the WT coefficients which is then normalized by the unweighted summation of the squares of the WT coefficients. The weights assigned to the sub-blocks of WT coefficients are as follows:

$w_1 = B/2^9$,
$w_2 = 3B/2^9$,
$w_3, w_4 = 3B/2^8$,
$w_5, \ldots, w_8 = 3B/2^7, \ldots$
$w_{129}, \ldots, w_{256} = 3B/2^2$ (wherein B is one-half the sampling rate) for respective ones of the 256 sub-blocks and assigned from low frequency to high frequency. This order of assignment of weights together with the order of processing and thresholds which will be discussed below seeks to balance the relative significance of high frequency signals (which can contain information relatively more important to localization of source 15 than low frequency signals but also more likely to contain noise or to be artifacts of the sampling process).

Figures 7, 7A:
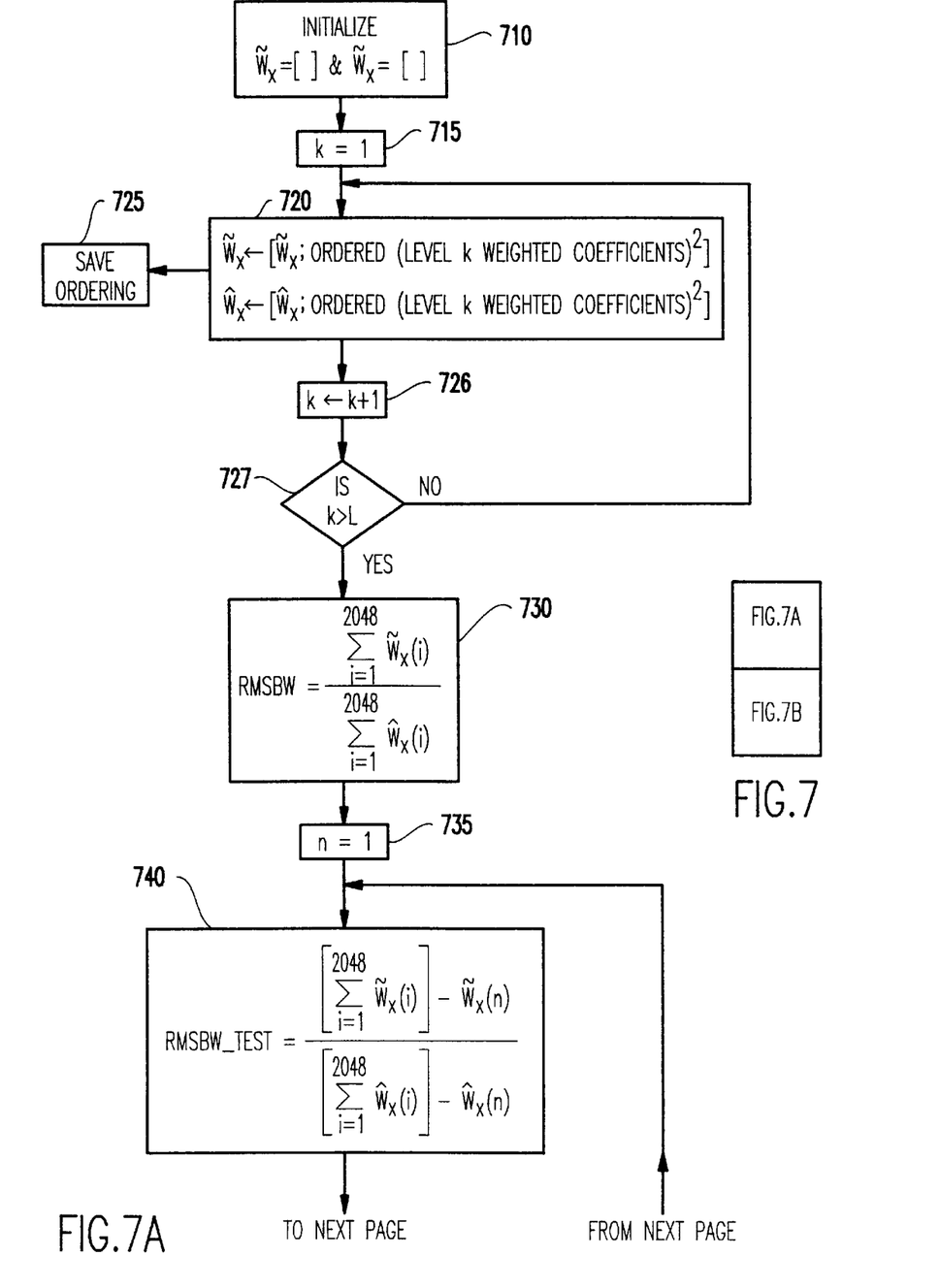
Figure 7B:
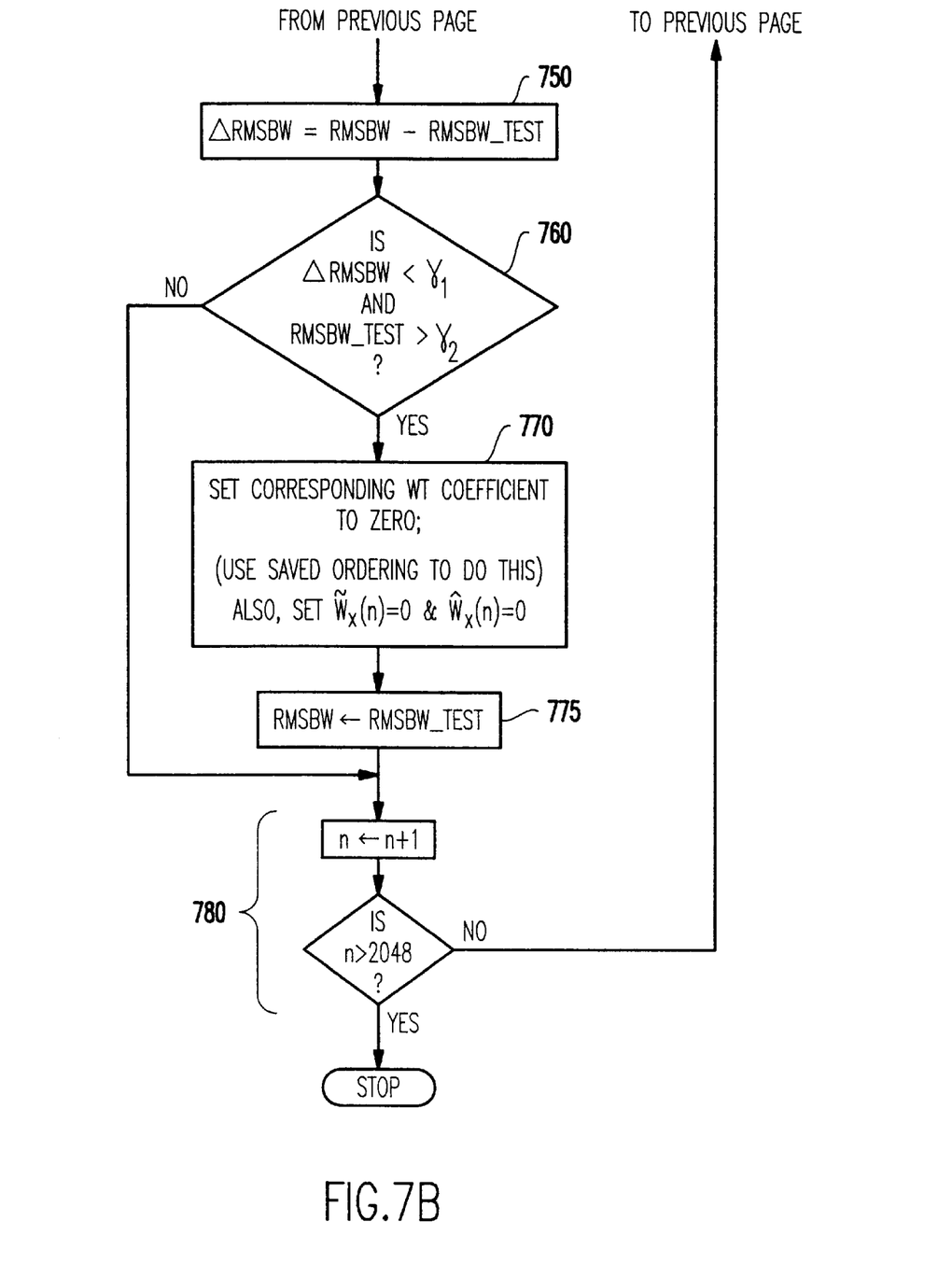

The perfecting feature is illustrated in FIG. 7. First the vectors $\tilde{W}_x$ and $\hat{W}_x$ are initialized to empty vectors as illustrated at 710 (in software terms, pointers are defined that point to the first location of memory allocated for each of these two vectors), and then a loop index k is initialized to k=1 as illustrated at 715. For each value of k between 1 and L, the following two processes are done as illustrated at 720: (i) take the $2^{M-k}$ wavelet coefficients at the $k^{th}$ level, weight each according to its respective sub-block using corresponding weight defined above, square the result, place the result in ascending order, and then append to the previously computed elements of $\tilde{W}_x$, and (ii) take the $2^{M-k}$ wavelet coefficients at the $k^{th}$ level, square the result, place the result in ascending order, and then append to the previously computed elements of $\hat{W}_x$ (note: because the weights are the same for each sub-block on a level, these two orderings are the same) the ordering should be saved as illustrated at 725 so that later this ordering can be reversed. After this process is done for each level, the value of k is incremented as illustrated at 726 and 727 and compared to L to see if the loop should be terminated.

Once the loop is terminated the RMS BW of the complete signal is computed as illustrated at 730 by forming the ratio of the sum of the elements in $\tilde{W}_x$ to the sum of the elements in $\hat{W}_x$. Next the loop index n is initiated to n=1 as illustrated at 735. For each value of n between 1 and 2048 compute a test value for the RMS BW when $\hat{W}_x(n)$ and $\tilde{W}_x(n)$ are eliminated from the sums used to compute the RMS BW. The change in RMS BW computed as illustrated at 750 due to this removal is an indication of the significance of the WT coefficient used to compute $\tilde{W}_x(n)$ to the accuracy of the TDOA estimate; this change is computed by subtracting the test RMS BW from the previously computed RMS BW, to provide ΔRMS BW. The significance of the removed coefficient is assessed by comparing ΔRMS BW to a preset threshold $\gamma_1$ as illustrated at 760; if the change is less than the threshold and the value of the test RMS BW is above some second-preset threshold $\gamma_2$, then the corresponding coefficient is deemed insignificant. The second threshold is used to guarantee that by eliminating WT coefficients the RMS BW does not drop so low that the TDOA accuracy be degraded too much. If these two threshold requirements are met then three steps are performed: (i) the saved ordering is used to zero-out the WT coefficient that was used to compute $\tilde{W}_x(n)$, (ii) set $\tilde{W}_x(n)=0$ and $\hat{W}_x(n)=0$, and (iii) the value of RMS BW is reset to the test RMS BW as illustrated at 775. On the other hand, if these two threshold requirements are not met then n is incremented and compared to 2048 as illustrated at 780 to see if the loop should be terminated. Thus, the process tends to preserve potentially significant high frequency components while discarding as many WT coefficients as possible but maintaining sufficient RMS bandwidth represented in the retained coefficients.

The "zeroing-out" process, while involving numerous computations, nevertheless provides a relatively rapid screening of the WT coefficients for their significance to a result of the cross-correlation for location determination and allows many to be set to zero which therefore need not be subjected to quantization processing as discussed above. This perfecting feature of the invention, while optional, is particularly effective in compensating for oversampling since oversampling results in large numbers of insignificant high-frequency coefficients. Additionally, if the WT coefficients remaining after RMS bandwidth processing are transmitted at the resolution and with the number of bits allocated by computation of Δ and $b_k$ as described above while no bits are used for the "zeroed-out" WT coefficients (other than identifying them in the header signal) even fewer bits will be translated (e.g. quantized, coded, etc.) and transmitted than would be determined for support of the SQR at a selectable level. Accordingly, faster response time can be expected or the bandwidth of the data can be reduced below the capacity of the communication link to increase reliability of transmission.

Whether or not the perfecting feature of RMS bandwidth screening of WT coefficients is employed, the above process thus allows the coefficients having significant values to be determined and transmitted at sufficient and adjustable resolution and with the minimum number of bits to support a user-specified level of performance. In other words, the invention allows the level of performance to be specified and the data rate varied accordingly, with response time minimized for the capacity of the available data link. Put another way, the performance of the invention compares favorably to a system utilizing four bit quantization but at a data rate equivalent to between 1 and 3.25 bits per sample, depending on signal characteristics and environment. That is, the present invention provides a degree of data compression which is about 8% to 75% greater than previously achieved while guaranteeing a user specified level of performance. For most signals, the degree of compression will at least approach 40%–50% greater than previously possible since lower degrees of compression will result from broad or "flat" power distribution of the signal over the time-frequency plane which is more characteristic of noise than a detected, identifiable signal. Quantization is automatically optimized to the circumstances of the required performance and the signal characteristics and environment.

Details of the remainder of the system which will now be discussed are not particularly critical to the practice of the invention so long as they support the data compression discussed above. The same will be true of the variant form of the invention which will be discussed below in connection with FIG. 6 which dynamically controls data compression to maximize performance in accordance with a user specified data rate.

Figure 3:
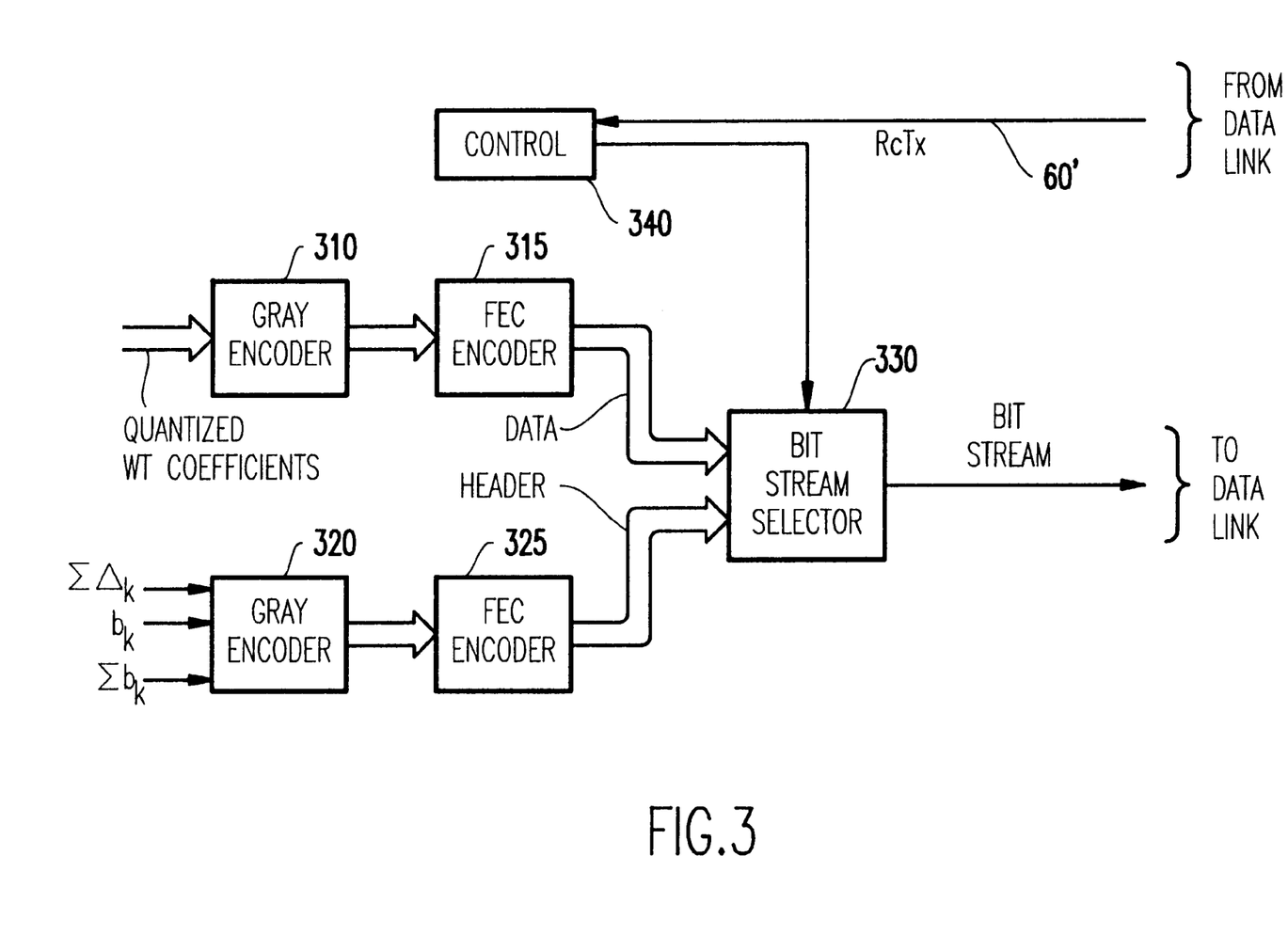
FIG. 3 is a high-level block diagram or flow chart showing a preferred form of coding and packing of compressed data for transmission in accordance with the invention.

Referring now to FIG. 3, the coding and packing of the compressed signal is illustrated in block diagram or flow chart form. It should be appreciated that the data which now represents the WT coefficients at the input of FIG. 3 may be regarded as two bit streams: (i) the quantized WT coefficients which will be transmitted as a variable length bit stream referred to as the data stream, and (ii) the quantizer step size, Δ, represented in binary using 8 bits, the 256 quantizer bit sizes, $b_k$, each represented in binary using 3 bits, and an error checking parameter, preferably $\Sigma b_k$ represented in binary using 11 bits, which will be transmitted as a fixed length bit stream referred to as the header. Of the two, accuracy of transmission of the header information is more critical. Thus separate encoding of the two streams allows tailoring the encoding process to the requirements of each stream which may result in some efficiencies in some applications of the invention as will be apparent to those skilled in the art. The particular coding scheme and code are not critical to the practice of the invention, but Gray coding in conjunction with forward error correction (FEC) is much preferred since such coding minimizes the impact of bit errors which may occur in the data link.

The coding process in FIG. 3 begins with Gray encoding of all entities in each of the two parts of the bit stream using encoders 310 and 320. A Gray code maps a binary word into another binary codeword having the same number of bits such that numerically adjacent codewords differ in only one bit position; under certain conditions this helps reduce the impact of bit errors. For example, the three-bit binary words used to represent the quantizer bit sizes, $b_k$, would each get mapped into a three-bit Gray code codeword.

After Gray encoding each respective data stream is then further encoded using FEC encoders 315 and 325 which introduce redundancies into the bit streams to allow correction of a limited number of errors in the received bit stream without the need to invoke a repeated transmission. The design of each of these two FEC encoders must be matched to the characteristics of the data link as will be apparent to those skilled in the art. A convolutional encoder is the preferred implementation form for FEC encoder 315 due to the variable length of the data bit stream; the amount of redundancy added by this encoder should be chosen to match the need imposed by the data link, but a rate ¾ encoder should be sufficient in most cases. The FEC encoding of the header bit stream via encoder 325 consists of three types of coding, one type for the quantizer sizes, $b_k$, one type for the quantizer step size, $\Delta$, and one type for the error checking parameter, $\Sigma b_k$. The quantizer sizes $b_k$ after Gray coding, consist of 768 bits which can be coded into a single Reed-Solomon (RS) code word using an RS(256,96) code on 8-bit symbols. Encoder 325 does this by grouping the 768 bits to be coded into 96 8-bit symbols that then get coded into 256 8-bit symbols according to the theory of Reed-Solomon codes. The quantizer step size, $\Delta$, after Gray coding, consists of a single 8 bit word. The four most significant bits are coded into a single Bose-Chadhuri-Hocquenghem (BCH) code word using a BCH(7,4); the resulting 7-bit code word is the appended to the front of the four least significant of the quantizer step size, $\Delta$, which gives an 11-bit word. This 11-bit word is then encoded by encoder 325 into a 31-bit code word using a BCH(31,11) code. Finally, the error checking parameter, $\Sigma b_k$, after Gray coding, is an 11-bit word and it is encoded by encoder 325 into a 31-bit code word using BCH(31,11) code word. These code words are then concatenated together to form the encoded header. The degree of correction available for the header provides extremely robust and exceptionally well-protected communication even over extremely poor and noisy data links.

The header and data streams for a block of signal data are placed in sequence for transmission by generally autonomous operation of bit stream selector 330. Additionally, while seldom necessary the operation of selector 330 may be controlled by controller 340 if error correction is not fully successful (e.g. for the header information) or if other types of errors not susceptible of correction are detected in the data stream as will be discussed below. In general, such an error will be the result of interruption of the communication link or the like which causes the loss of numerous data bits. For this reason, $\Sigma b_k$ is computed at 135 of FIG. 2 as a check on the number of bits in the compressed data (before encoding). If a similar sum of the number of bits cannot be reconstructed at the receiver, the data cannot be considered to be accurately reconstructed. Thus retransmission would be required.

Figure 4:
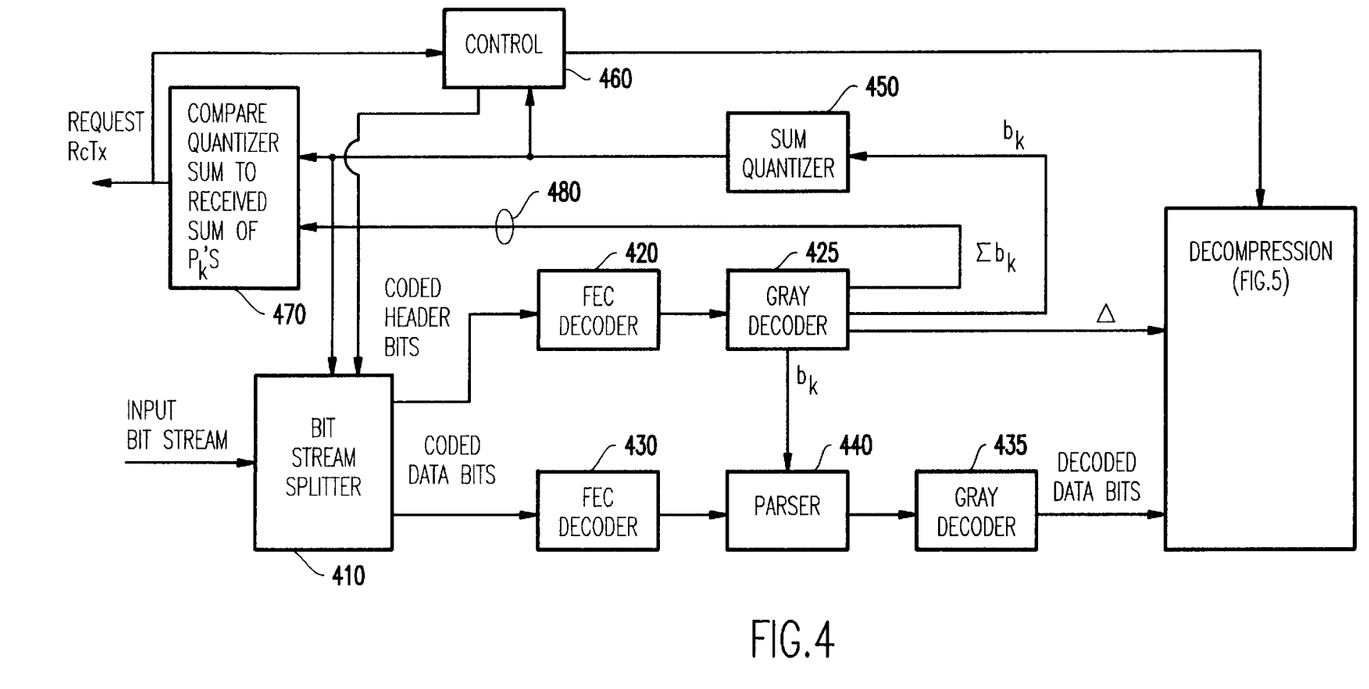
FIG. 4 is a high-level block diagram or flow chart showing a preferred form of decoding and unpacking of received compressed data in accordance with the invention.

Referring now to FIG. 4, the decoding of the received data stream will now be discussed. While the header and data are transmitted as a single data stream, the header and data will be separated by bit stream splitter 410. The operation of such a splitter is simple and well-understood since the header information will be transmitted as a fixed length data stream. Thus a particular number of code symbols (e.g. one codeword, as alluded to above) can simply be extracted from the bit stream and the remainder of the bit stream will be the data. Note that if a number of symbols are lost from the header and cannot be reconstructed, extraction of a fixed length of code will be detected as missing bits in the transmitted length of data and retransmission can be requested.

In a manner complementary to the coding and packing of FIG. 3, the header and data streams thus separated are first decoded by FEC decoders 420, 430, respectively. The header stream is then decoded by gray decoder 425 to recover $\Delta$ and $b_k$, which are provided to parser 440 to segment the data stream into sub-blocks and to the decompression process for identifying the WT coefficients which are reconstructed, and $\Sigma b_k$, which is provided to a comparator 470 for error detection. (Each group of $b_k$ bits corresponding to a transmitted WT coefficient is converted into a gray code codeword.) The values of $b_k$ are also provided to an adder 450 which sums the quantizer sizes for comparison with $\Sigma b_k$ at 470. The parsed gray code is then decoded at 435 to yield the compressed bit stream.

The control function 460 controls the operation of the bit stream splitter 410 to ensure that the splitting operation is properly synchronized with the boundaries between the header and data bit streams. This is accomplished by computing the sum of the received and decoded quantizer sizes, $b_k$, and providing the result to bit stream splitter 410 so that it can find the boundary between tile current data bit stream and the next header. In addition, this computed sum of the received and decoded quantizer sizes $b_k$, is compared to the received and decoded error checking parameter, $\Sigma b_k$, via function 470; if they are equal then normal processing continues, and if they are not equal then a request for retransmission of this block is issued. This request is sent via the data links reverse channel to the remote site and is also sent to control function 460 which then (i) causes the bit stream splitter to be halted and resets the decode/unpack subsystem, and (ii) informs the decompression subsystem that it should purge itself of the decoded header information from the current block.

Figure 5:
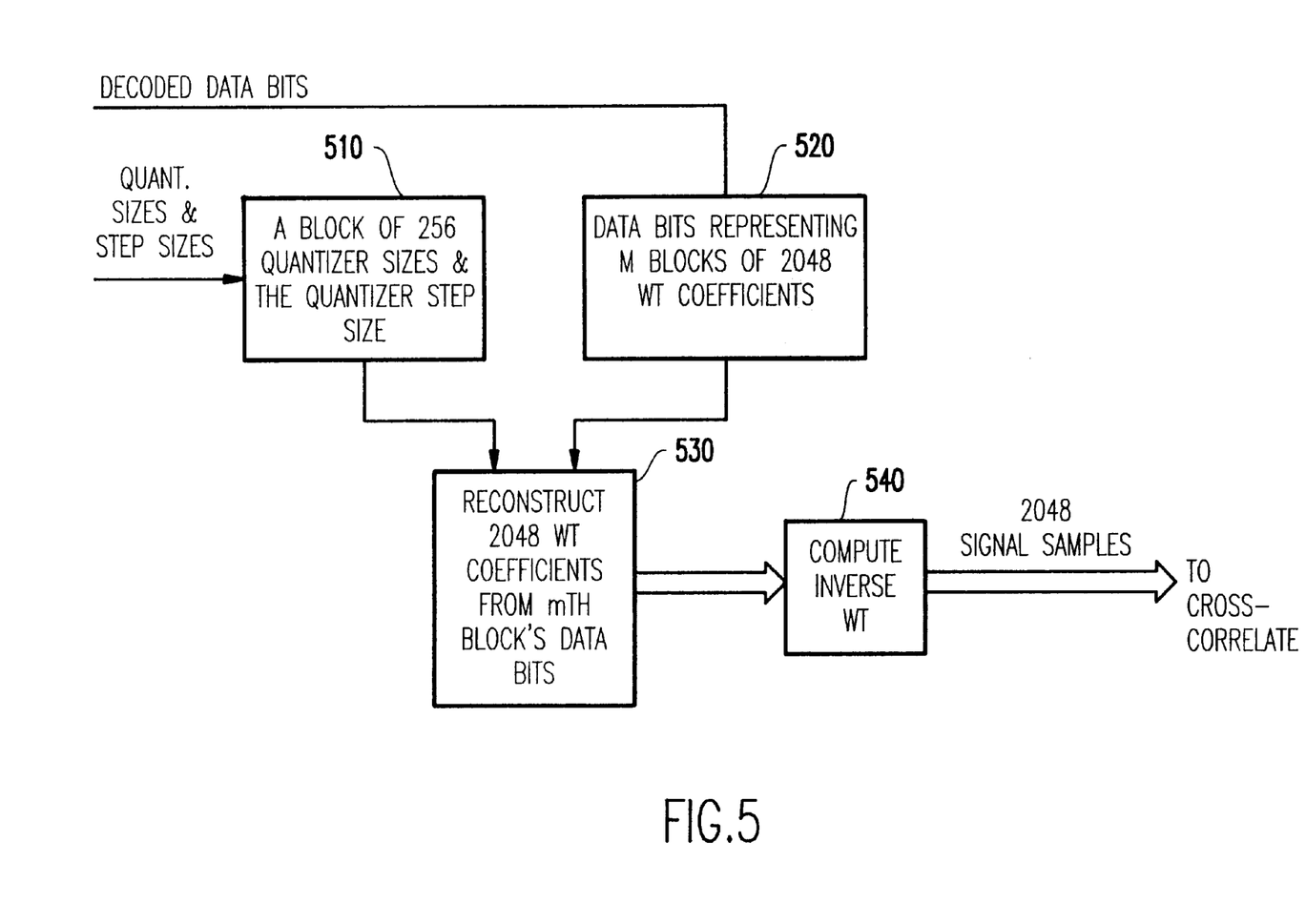
FIG. 5 is a high-level block diagram or flow chart illustrating decompression of a compressed signal in accordance with the invention.

The decompression process is shown in FIG. 5 and is generally complementary to the data compression process of FIG. 2. A block of 256 quantizer sizes and the corresponding quantizer step sizes is accumulated at 510 and the decoded data bit stream is accumulated at 520. These data are then merged at 530 to reconstruct the WT coefficients at 530 and the inverse wavelet transform discussed above is performed at 540 to reconstruct a close approximation of the original signal samples for the cross-correlation process 90 of FIG. 1.

Figure 6:
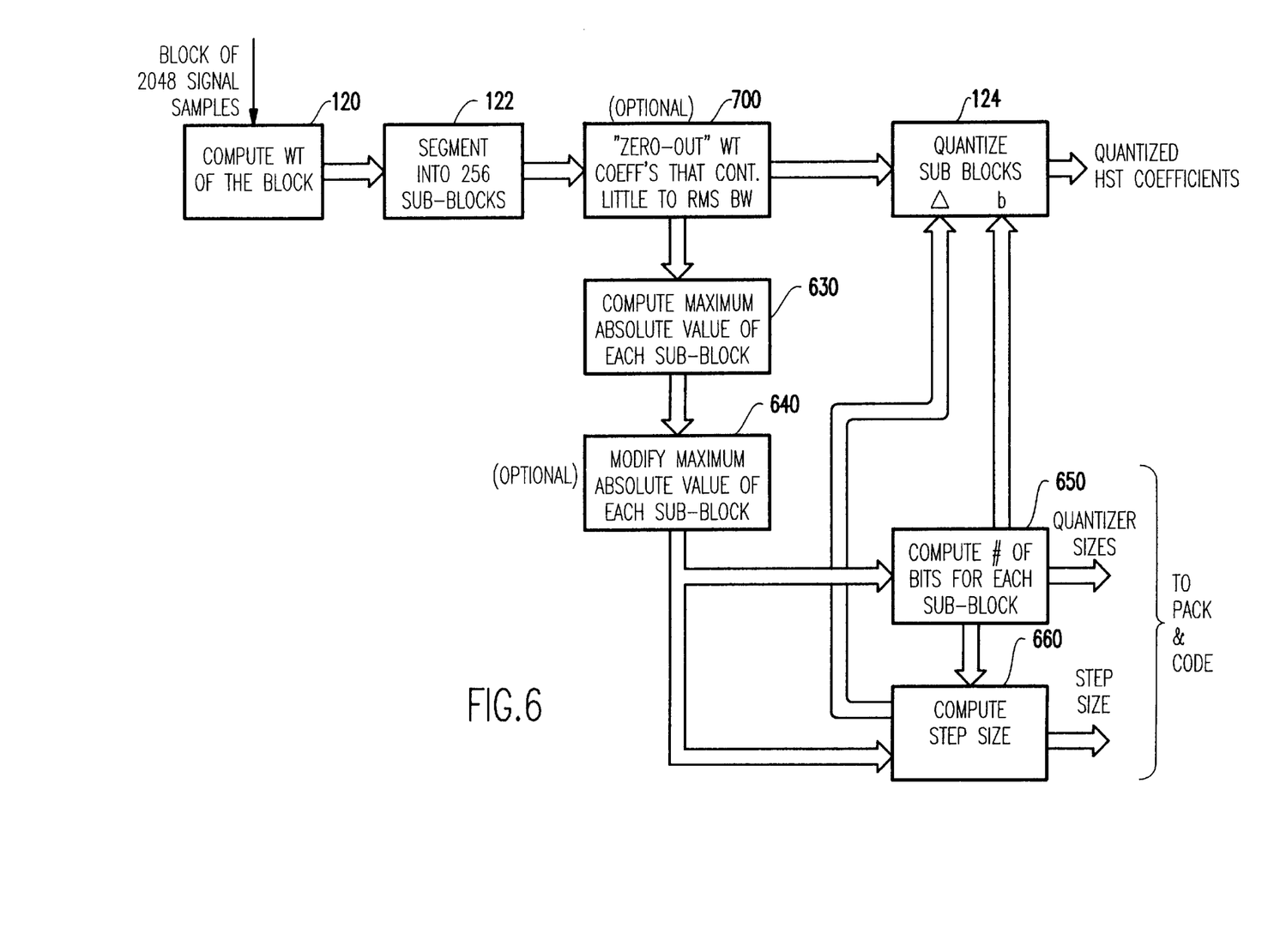
FIG. 6 is a high-level block diagram or flow chart illustrating an alternate, variant form of a compression scheme in accordance with the principles of the invention, and FIG. 7, consisting of FIGS. 7A and 7B, is a high-level block diagram or flow chart depicting a perfecting feature of the invention as illustrated in FIGS. 2 and 6.

Referring now to FIG. 6, an alternative, variant embodiment of the invention will be discussed. As noted above, the preferred embodiment provides for the user to quantitatively specify a level of desired performance and data compression will be performed to minimize data rate and communication link bandwidth which will guarantee the performance level specified, particularly in combination with the preferred coding discussed above which will provide robust and reliable transmission over very poor communication links. It was noted that other quantitative performance criteria could also be employed rather than one based on SQR within the principles of the invention.

However, it will sometimes be the case that a relatively low data rate will impose a limitation on the system performance or it may be desired to obtain the most accurate position location performance available from the system employing a data link having a specific data rate or bandwidth capacity. In other cases in which an extremely poor data link may cause requests for retransmission to be issued with greater frequency than may be acceptable at a rated bandwidth, it may be desirable to derate the bandwidth of the communication link by specifying a limitation on the data rate.

Accordingly, a variant embodiment of the invention is substantially the converse of the preferred embodiment in that it provides the facility for user specification of the desired data rate of the system and the same principles of the invention discussed above to maximize performance (e.g. SQR) of the system within that data rate. This facility and difference from the preferred embodiment of the invention described above lies entirely within the data compression process and, with the sole exception of not requiring computation and transmission of $\Sigma b_k$, as discussed above with reference to FIG. 4 (e.g. in which connection 480 can be omitted since the bit length used to represent each sub-block is constant and known).

It should be understood that the data rate may be specified in numerous ways and computed, if necessary from the bandwidth or other known parameters of the communication link. For example, the data rate may be specified as the raw bit rate, average number of bits per sample, the total number of bits per block, the number of bits which may be transmitted consistent with desired response time or the like. Generally, the preferred coding, as discussed above will provide a sufficiently robust communication link within the known (or derated) bandwidth of the communication link. In any event, the data rate should be known or derived at both ends of the data link at least concurrently with the computation of the wavelet transform of a given block of signal samples and could, in theory be varied from block-to-block of signal samples. From the desired expression of the desired data rate, the number of bits to be used for each block is determined, by computation if necessary, and will be referred to hereinafter as bit rate, R, which will be a multiple (corresponding to the number of WT coefficients in each sub-block) of 8.

As in the embodiment described above with reference to FIG. 2, the signal of interest is broken into one or more blocks of 2048 samples and the eight level wavelet transform is computed, as indicated at 120 of FIGS. 2 and 6, for a block as described above to yield 2048 WT coefficients corresponding to the block. The WT coefficients are then segmented into 256 sub-blocks of eight WT coefficients each, as indicated at 122 of FIGS. 2 and 6, beginning with the lowest frequency/earliest time WT coefficient, increasing frequency only after exhausting WT coefficients at the current frequency level in time order, as before. At this point, some WT coefficients can be "zeroed-out" as an optional perfecting feature of this embodiment as in the previously described preferred embodiment of the invention (illustrated at 130 and 135 of FIG. 2), as depicted at 700 of FIG. 6.

As distinct from the preferred embodiment of FIG. 2, however, function 630 computes the maximum absolute value of each sub-block and puts the 256 resulting numbers into the vector $M=[M_1, M_2, M_3, \ldots, M_{256}]$, where the order of the sub-blocks is the same as the order in which the sub-blocks were created, as described above.

An optional perfecting feature of this embodiment, performed in 640, is to modify the elements in M according to $M=[\sqrt{w_1}M_1, \sqrt{w_2}M_2, \sqrt{w_3}M_3, \ldots, \sqrt{w_{256}}M_{256}]$ where the weights $w_1$ through $w_{256}$ are defined above. (These new elements of M will now be notated as $M_1, M_2, M_3, \ldots, M_{256}$). This step allows more weight to be placed on components that contribute more significantly to the signal's RMS BW, and thus can lead to better system performance for a given data rate.

The specified number of bits, R, available for the block of WT coefficients as allocated over the 256 sub-blocks in a generally nonuniform distribution in 600. The bit allocations, $b_j$ (corresponding to the quantizer size, $b_k$, in the above discussion but differently processed) are then (or earlier) initialized to zero (e.g., $b=[b_1, b_2, b_3, \ldots b_{256}]=[0, 0, 0, \ldots, 0]$). The largest element in M, say Mj., is found, the corresponding bit allocation is incremented by 1, the value $M_j$ is replaced by half its value ($M_j$ is set to $M_j/2$ in accordance with the significance of the bit to be placed in the location thus allocated), and the value of R is decremented by 8. The process is repeated while R>0 (the largest element in M now may and is likely to differ from $M_j$, the value of which has been reduced to Mj/2) and halted when all of the bit rate R has been allocated (e.g., R=0). In this way, collectively indicated at 650 of FIG. 6 the specified bit rate is allocated, in order of significance, to the sub-blocks by development of the number of bits, $b_j$ to be assigned to each element in a sub-block (e.g., each of the eight elements in the $j^{th}$ sub-block is quantized using $b_j$ bits).

The quantizer step is then preferably computed for each sub-block according to the formula: $\Delta=2\max\{M_1 2^{-b1}, M_2 2^{-b2}, \ldots M_{256}2^{-b256}\}$ as illustrated at 660. It should be noted that this computation ensures that the quantizer step size is large enough that each quantizer can cover the dynamic range (or maximum absolute value among one or more WT coefficients) of its corresponding sub-block.

Each of the sub-blocks of WT coefficients can now be quantized in the same manner as in the preferred embodiment using $\Delta$ and b, as indicated at 124 of FIGS. 2 and 6, except that $\Sigma b_k$ is not variable but specified as $R=S(b_1+b_2, \ldots +b_{256})$ in which S is the number of WT coefficients in a sub-block and where $b_j$ is still dynamically allocated but the sum bounded by the specified data rate R. Since R is specified and, hence, known, $\Sigma b_k$ need not be computed or transmitted. Otherwise, the values of b and $\Delta$ (for the header bit stream) and the quantized WT coefficients (for the data stream) are sent to the coding and packing process of FIG. 3 and processed exactly in the same manner. Unpacking, decoding and decompression are also performed precisely as described above except that $\Sigma b_k$ is not transmitted, decoded or provided to comparator 470 of FIG. 4 since it is already known. However, comparator 470 continues to function in the same manner to control a request for retransmission if the sum of the decoded quantizer sizes doesn't equal R/S, which is known.

In addition, because the transmitted data bit stream has a fixed size per block in the variant form of the invention described above as opposed to a variable size per block in the preferred embodiment, it is possible to use a block-based forward error correction code (as opposed to a convolutional code preferably used in the preferred embodiment of the invention) as will be apparent to those skilled in the art in light of the foregoing description of the invention. A block-based code, of course, permits exploitation of known length of portions of the bit stream in the error correction process such that less redundant information and, therefore, fewer bits need to be transmitted. This feature of the variant form of the invention thus allows a greater portion of the specified bandwidth to be allocated to the transmission of data descriptive of the received signal waveform.

In view of the foregoing, it is seen that the invention provides a data compression arrangement particularly suitable for position location systems, synthetic aperture radar systems and any other systems which require rapid and relatively high-fidelity transmission of information representing waveforms (e.g. to accommodate a subsequent cross-correlation operation). The invention provides a data compression arrangement which allows control of both system response speed and data transmission quality, enhanced performance within data link capacity while improving reliability of communication, adaptive data compression to minimize distortion such as quantization noise, optionally including a measure of the impact of the compression on the RMS bandwidth of the signal, while guaranteeing desired, user-specified parameters of system performance and compensation for excess data from oversampling.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A data compression method for the digital transmission of waveform information, said method comprising the steps of sampling the waveform to develop a block of samples, performing a transform on said samples of said block of samples to derive a plurality of coefficients, segmenting said plurality of coefficients into a plurality of sub-blocks, deriving a quantizer size and a quantizer step size in accordance with a user-specified parameter and a maximum absolute value of coefficients in a sub-block, and quantizing said plurality of coefficients in accordance with said quantizer size and said quantizer step size.

2. A method as recited in claim 1, wherein said transform is a wavelet transform.

3. A method as recited in claim 1, wherein said user-specified parameter is a data rate.

4. A method as recited in claim 1, wherein said user-specified parameter is a data link bandwidth.

5. A method as recited in claim 1, wherein said user-specified parameter specifies a limit on quantization noise.

6. A method as recited in claim 1, including the further steps of computing a sum of quantizer sizes over a block of coefficients corresponding to said block of samples, and detecting an error in accordance with said sum of quantizer sizes.

7. A method as recited in claim 1, including the further step of transmitting said quantizer size, said quantizer step size and results of said quantizing step over a communication link, and controlling retransmission of at least one of said quantizer size, said quantizer step size and said results of said quantizing step in response to said step of detecting an error.

8. A method as recited in claim 1 including the further step of encoding said quantizer size, said quantizer step size and said results of said quantizing step with a forward error correction code.

9. A method as recited in claim 1 including the further step of encoding said quantizer size, said quantizer step size and said results of said quantizing step with a gray code.

10. A method as recited in claim 8 including the further step of encoding said quantizer size, said quantizer step size and said results of said quantizing step with a gray code.

11. A method as recited in claim 1, including the further step of setting selected ones of said plurality of coefficients to zero.

12. A method as recited in claim 11, wherein said setting step includes comparison of said coefficients with a threshold based on RMS bandwidth of said waveform.

13. A method as recited in claim 1, including the further step of setting a quantizer size for a sub-block to zero.

14. A method as recited in claim 13, wherein said setting step includes comparison of said coefficients with a threshold based on RMS bandwidth of said waveform.

15. A method as recited in claim 11, including the further step of setting a quantizer size for a sub-block to zero.

16. A method as recited in claim 15, wherein one of said setting steps includes comparison of said coefficients with a threshold based on RMS bandwidth of said waveform.

17. A method as recitde in claim 1, further including the step of modifying said maximum absolute value prior to said deriving step.

18. A data compression arrangement for the digital transmission of waveform information comprising means for sampling the waveform to develop a block of samples, means for computing a transform on said samples of said block of samples to derive a plurality of coefficients, means for segmenting said plurality of coefficients into a plurality of sub-blocks, means for computing a quantizer size and a quantizer step size in accordance with a user-specified parameter and a maximum absolute value of coefficients in a sub-block, and means for quantizing said plurality of coefficients in accordance with said quantizer size and said quantizer step size.

19. An arrangement as recited in claim 18, further comprising means for setting selected ones of said coefficients to zero.

20. An arrangement as recited in claim 19, further including means for comparing said coefficients to a threshold based on RMS bandwidth of said waveform.

21. An arrangement as recited in claim 18, further comprising means for setting selected ones of said quantizer sizes to zero.

22. An arrangement as recited in claim 21, further including means for comparing said coefficients to a threshold based on RMS bandwidth of said waveform.

23. An arrangement as recited in claim 19, further comprising means for setting selected ones of said quantizer sizes to zero.

24. An arrangement as recited in claim 23, further including means for comparing said coefficients to a threshold based on RMS bandwidth of said waveform.

25. An arrangement as recited in claim 18, further including means for modifying said maximum absolute value of coefficients in a sub-block.

26. A position locating arrangement including a data link for the digital transmission of waveform information and an arrangement for compressing data to be transmitted over said data link, said arrangement for compressing data comprising means for sampling the waveform to develop a block of samples, means for computing a transform on said samples of said block of samples to derive a plurality of coefficients, means for segmenting said plurality of coefficients into a plurality of sub-blocks, means for computing a quantizer size and a quantizer step size in accordance with a user-specified parameter and a maximum absolute value of coefficients in a sub-block, and means for quantizing said plurality of coefficients in accordance with said quantizer size and said quantizer step size.

27. An arrangement as recited in claim 26, further comprising means for setting selected ones of said coefficients to zero.

28. An arrangement as recited in claim 27, further including means for comparing said coefficients to a threshold based on RMS bandwidth of said waveform.

29. An arrangement as recited in claim 26, further comprising means for setting selected ones of said quantizer sizes to zero.

30. An arrangement as recited in claim 29, further including means for comparing said coefficients to a threshold based on RMS bandwidth of said waveform.

31. An arrangement as recited in claim 27, further comprising means for setting selected ones of said quantizer sizes to zero.

32. An arrangement as recited in claim 30, further including means for comparing said coefficients to a threshold based on RMS bandwidth of said waveform.

33. An arrangement as recited in claim 26, further including means for modifying said maximum absolute value of coefficients in a sub-block.

* * * * *